W. WOLFE & D. PARKS.
METHOD OF BUILDING HEEL BLANKS.
APPLICATION FILED APR. 26, 1915.
1,157,355.
Patented Oct. 19, 1915.
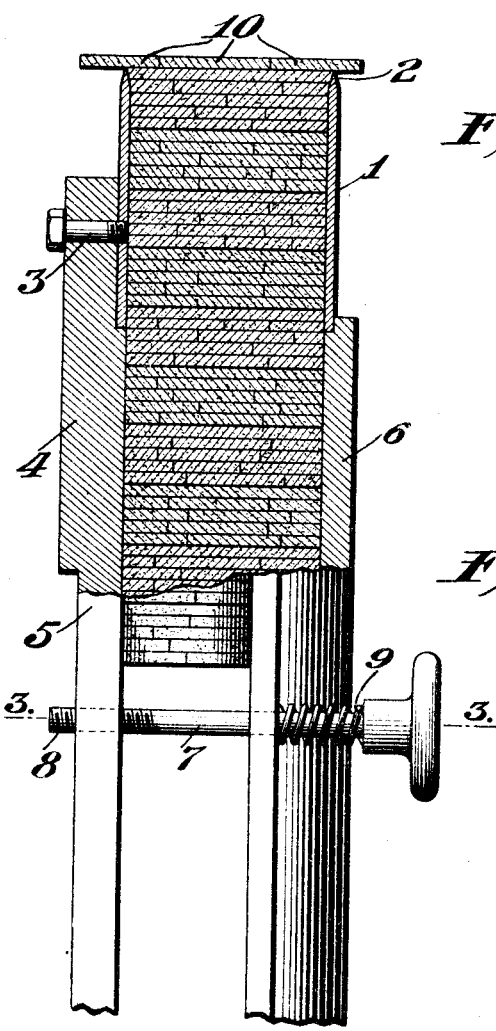
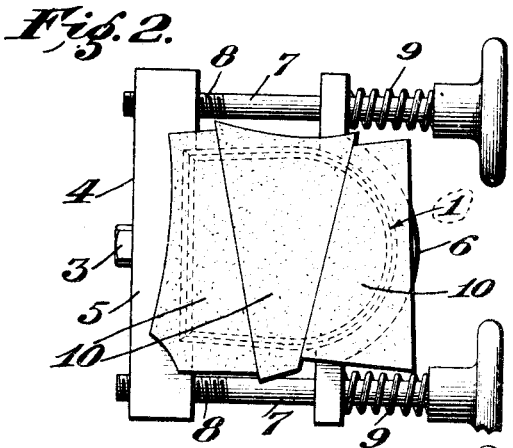
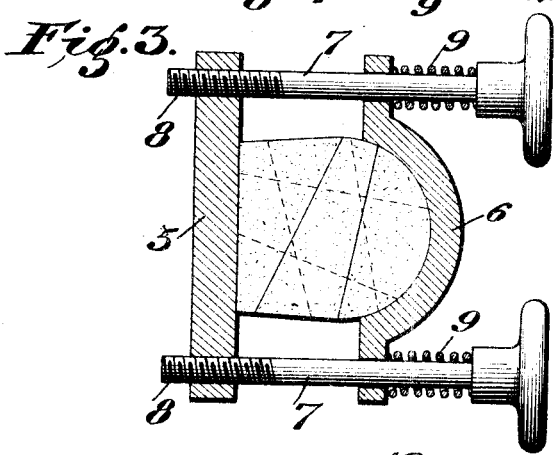
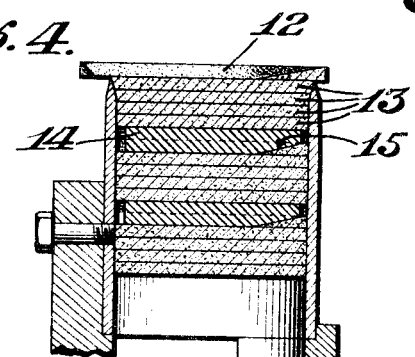
Inventors:
William Wolfe,
Dennis Parks,
By Bruce S. Elliott,
their Atty.

UNITED STATES PATENT OFFICE.

WILLIAM WOLFE AND DENNIS PARKS, OF ST. LOUIS, MISSOURI.

METHOD OF BUILDING HEEL-BLANKS.

1,157,355.  Specification of Letters Patent.  Patented Oct. 19, 1915.

Application filed April 26, 1915. Serial No. 23,956.

*To all whom it may concern:*

Be it known that we, WILLIAM WOLFE and DENNIS PARKS, citizens of the United States, residing in the city of St. Louis and State of Missouri, have invented new and useful Improvements in Methods of Building Heel-Blanks, of which the following is a specification.

This invention relates to a novel method of producing heel-blanks from either whole or pieced lifts.

The invention has for its general object to enable heel-blanks to be manufactured in a more simple and economical manner than has heretofore characterized the production of this article, and notably by combining in a few simple operations, performed by a single machine, or performed as parts of a continuous process by a single operator, various steps in the manufacture of heel-blanks which have heretofore been practised separately, and which have involved the use of various machines and the employment of a number of operators.

In the production of heel-blanks from pieced lifts a very common method followed is to cut from scrap leather pieces to be fitted together to form the pieced lifts, these pieces being of different shapes but of such size and configuration that when a certain number of them, usually three, are properly fitted together they will form a symmetrical lift of the desired size. Operators are employed to cut these pieces, and the pieces, according to their shape and size, are stored in separate compartments or bins and are supplied to the heel builder. The latter fits these pieces together to form a series of superimposed lifts in a mold, applying paste between adjacent lifts, and then the lifts are nailed together. The compiled lifts, constituting a heel-blank, are then placed in a press and held under pressure until the paste has set. This manner of procedure involves at least three distinct operations, performed usually by as many operators, viz., the cutting of the pieces, the assembling and compiling of the lifts, and the pressing of the compiled lifts to form a compact heel-blank.

Again, another common method is to build up a log of indefinite length by assembling and pasting together pieces which have previously been cut as described, the log as formed being gradually forced down into a relatively long holder. Lifts are then sawed from this log and assembled in a mold in the well-known manner to form heel-blanks.

Still another method consists in cutting and pressing down in a die a series of lifts in the number required to form a heel-blank, applying paste between adjacent lifts, and when the desired number of lifts have been thus cut and assembled, nailing them together. The heel-blank is then removed from the die and subjected to pressure until the paste is set.

Our method of procedure differs from all previous methods known to us in that the operations of cutting the lifts, either whole or pieced, compiling the same into heel-blanks, involving, of course, pasting, separating the heel-blanks from each other, placing the completed heel-blanks under pressure and maintaining them under such pressure until the paste has set, are all performed as parts of a continuous operation by a single operator, and preferably, as will hereinafter be more specifically mentioned, by the use of a single machine. Furthermore, our method also permits the cutting and application to the heel-blanks of a rand, and securing the intimate attachment of the same to the heel-blank as a continuation of, or addition to, the foregoing method. In this manner the storage of a large quantity of lifts, or lift-pieces, the employment of several operators, and the use of several different machines, are obviated, effecting a great economy in manufacture, and increasing the rapidity with which the heel-blanks can be manufactured.

In the manufacture of heel-blanks from whole lifts we would preferably employ the machine forming the subject-matter of application for Letters-Patent filed by John E. Mitchell and Dennis Parks on November 2nd, 1914, Serial Number 869,740; in the manufacture of heel-blanks from pieced lifts we may employ a machine such as illustrated in application for Letters-Patent of William Wolfe and Dennis Parks, filed December 31st, 1914, Serial Number 879,858; or a certain improved machine of which we have knowledge, and an application for patent on which was filed by Dennis Parks, one of the joint inventors of the present invention, on June 1st, 1915, and serially numbered 31,371.

For the purpose of the present case, however, we have illustrated in the accompanying drawing simple devices by which our method may be practised by hand.

In said drawing—Figure 1 illustrates in side elevation a mallet, and partly in section, and partly in elevation, a combined die and holder with a series of heel-blanks inclosed therein, and some matched pieces of leather supported on top of the die in position to be cut and pressed down into the die by the mallet; Fig. 2 is a top plan view of the parts below the mallet shown in Fig. 1; Fig. 3 is a horizontal sectional view taken on the line 3—3 of Fig. 1; and Fig. 4 is a central vertical sectional view through a die containing a series of heel-blanks having a rand applied thereto and separated by interposed plates, and also showing a rand in position on the die to be cut and applied to the topmost heel-blank.

Referring now to the drawing, the numeral 1 indicates a die having an upper cutting edge 2 and secured, as by means of a screw 3, in the upper end of a holder 4. The holder 4, as shown more clearly in Fig. 3, comprises what may be termed a breast-plate 5, and a back-plate 6, the latter curved to conform to the back of the heel-blank, said plates being yieldably held in adjustable, separated relation by means of bolts 7 passing loosely through apertures in opposite sides of the back-plate 6 and having screw-threaded ends 8 engaging in screw-threaded apertures formed in opposite sides of the plate 5. Between the back-plate 6 and the heads of the bolts 7 are interposed coil springs 9. By screwing up the bolts 7 the springs 9 force the back-plate 6 nearer to the breast-plate 5. Or, which is practically the same thing, for a given adjustment of the back-plate with reference to the breast-plate, by screwing up the bolts 7 the springs 9 will be caused to exert a greater pressure on the back-plate 6. It will be understood that the die 1 is removable, and that with a larger or smaller die the adjustment of the back-plate 6 will vary accordingly. The pressure exerted by the springs 9 is always sufficient to insure a firm, frictional engagement of the plates 5 and 6 with the heel-blanks forced down into the holder 4, as later described, and preferably the bolts 7 are located sufficiently near to the lower end of the holder 4 to cause the lower portion of the back-plate 6 to be forced nearer to the breast-plate 5 than the upper portion so that the resistance to the movement downward of the heel-blanks increases slightly in the direction of the lower, or discharge end, of the holder.

In proceeding according to our method, pieces of leather 10, preferably three in number, are placed upon the top of the die 1 with their straight edges matching, as shown in Fig. 2, and the mallet 11 is brought down with some force by the operator upon the pieces of leather, which causes them to be cut by the die and to be forced down into the same. Paste is then applied to the pieced lift thus formed, three pieces of leather are again assembled on top of the die, and cut by the mallet and forced down into the die as before. In this operation the preceding lift is forced down in the die by the lift last cut. This operation is repeated until a sufficient number of lifts have been cut, pasted and assembled in the die to form a heel-blank of the desired height. The operator then proceeds to assemble pieces of leather upon the die as before, but without placing any paste upon the lift last cut, which represents the top lift of the heel-blank. It will readily be seen that a continuation of the preceding operations will result in a plurality of series of compiled and pasted lifts, constituting heel-blanks, being gradually forced downward through the die 1 and into the holder 4. It will also be apparent that, owing to the resistance offered to the movement of the heel-blanks through the holder, the cutting of each new lift will result in forcing the heel-blanks downward in the holder under pressure; and also that the grip of the plates 5 and 6 on the heel-blanks will be such as to overcome the tendency of the lifts to rebound or expand after the pressure has been applied. It therefore follows that the compiled lifts, or heel-blanks, are forced slowly downward in the holder under pressure, which pressure is maintained until the first heel-blank formed passes out of the lower end of the holder, by which time the paste between the lifts has thoroughly set. A holder approximately two feet in length will be sufficient to insure that the lifts are maintained under pressure a sufficient length of time to permit the paste to set. As each heel-blank is forced beyond the lower end of the holder it of course falls away by gravity, as it is not connected in any way with the heel-blank above it.

It will be readily understood by those skilled in the art that heel-blanks composed of whole lifts can be manufactured by our method by placing on the die pieces of leather large enough to permit an entire lift to be cut in each operation; and, as illustrating this feature, the heel-blanks in the die in Fig. 4 are shown as composed of whole lifts.

In making heels of relatively low height it is customary to secure a rand to the upper side of the heel-blank. This purpose is effected according to our method, as illustrated in Fig. 4, by pasting the top lift of the heel-blank and then placing thereon, around the edge and extending over the sides and rear, or curved portion, of the die, a rand-strip 12, and then causing the same to be cut and forced down on the heel-blank 13 by the impact of the mallet 11. A plate 14 of the configuration of the heel-blank and having the under side of its side and rear edge portions provided with an upward incline 15, corresponding to the incline of the rand, is next placed upon the heel-blank, and said plate, with the heel-blank, is forced down into the die by a blow of the mallet. A heel-blank is then built up on top of this plate according to the method previously described. A continuation of this procedure will result in filling the die and holder with a series of alternating heel-blanks and plates, as will be understood, and as the first heel-blank formed is forced out of the bottom of the holder said heel-blank and the plate immediately above it will fall away. During the time the heel-blanks are in the holder the rands are held firmly pressed against the tops of the heel-blanks by the plates, and by the time the heel-blanks are discharged from the bottom of the holder the paste will have set and the rands have been firmly secured to the heel-blanks.

We can equally well employ plates for separating heel-blanks where no rand is applied, instead of merely omitting paste as previously described, and such method of procedure is disclosed in the Mitchell and Parks application above referred to.

We claim:

1. The method of building heel-blanks which consists in continuously cutting lifts and simultaneously with its cutting superimposing each lift upon, and attaching it to, a preceding lift with accompaniment of pressure, until a heel-blank of the desired height is formed, then forming a second heel-blank upon the first in the same manner, and continuing the above operations while confining a plurality of the heel-blanks thus formed in column formation under pressure and in disconnected relation.

2. The method of building heel-blanks which consists in continuously cutting lifts and simultaneously with its cutting superimposing each lift upon, and attaching it to, a preceding lift with accompaniment of pressure, until a heel-blank of the desired height is formed, then forming in like manner a second heel-blank upon, but in separated relation to, the first heel-blank, and continuing the above operations while confining a plurality of the separated heel-blanks thus formed in column formation and under pressure.

3. The method of building heel-blanks which consists in continuously cutting lifts and simultaneously pressing them into a container, and at the same time superimposing each lift upon, and attaching it to, a preceding lift with accompaniment of pressure, until a heel-blank of the desired height is formed, then forming a second heel-blank upon the first in the same manner, and continuing the above operations while confining a plurality of the heel-blanks thus formed in column formation under pressure and in disconnected relation.

4. The method of building heel-blanks which consists in continuously cutting and pasting lifts, and simultaneously with its cutting superimposing each lift upon a preceding pasted lift with accompaniment of pressure, until a heel-blank of the desired height is formed, then forming a second heel-blank upon the first in the same manner, and continuing the above operations while confining a plurality of the heel-blanks thus formed in column formation under pressure and in disconnected relation.

5. The method of building heel-blanks which consists in continuously cutting and pasting lifts and simultaneously with its cutting superimposing each lift upon a preceding pasted lift with accompaniment of pressure until a heel-blank of the desired height is formed, then forming a second heel-blank upon the first in the same manner, and continuing the above operations while confining the heel-blanks thus formed in column formation under pressure and in disconnected relation until the paste on the heel-blanks in the order of their formation has had time to set.

6. The method of building heel-blanks which consists in continuously cutting and pasting lifts and simultaneously with its cutting superimposing each lift upon a preceding pasted lift with accompaniment of pressure until a heel-blank of the desired height is formed, then forming a second heel-blank upon the first in the same manner, continuing the above operations while confining the heel-blanks thus formed in column formation under pressure and in disconnected relation, and continuously separating the heel-blanks from the confined column in the order of their formation.

7. The method of building heel-blanks which consists in continuously cutting and pasting lifts and simultaneously with its cutting superimposing each lift upon a preceding pasted lift with accompaniment of pressure until a heel-blank of the desired height is formed, then forming a second heel-blank upon the first in the same manner, continuing the above operations while confining the heel-blanks thus formed in column formation under pressure and in disconnected relation, and automatically separating the heel-blanks from the confined column in the order of their formation.

8. The method of building heel-blanks which consists in continuously cutting and pasting lifts and simultaneously with its cutting superimposing each lift upon a preceding pasted lift with accompaniment of pressure until a heel-blank of the desired height is formed, then applying a lift to the completed heel-blank without interposing paste and proceeding to build a second heel-blank with said lift as the base in the same manner as before, and continuing the above operations while confining a plurality of the heel-blanks thus formed in column formation and under pressure.

9. The method of building heel-blanks which consists in assembling pieces of leather or the like over a die in matched relation, and then applying pressure to the leather to cause the same to be cut by and pressed into the die, applying paste to the pieced lift thus formed, cutting and (simultaneously) superimposing thereon a second lift in the same manner as before, and continuing these operations until a heel-blank of the desired height is formed, then forming a second heel-blank upon the first in the same manner, and continuing the above operations while confining a plurality of the heel-blanks thus formed in column formation under pressure and in disconnected relation.

10. The method of building heel-blanks which consists in cutting lifts and superimposing each lift upon, and attaching it to, a preceding lift with accompaniment of pressure, until a heel-blank of the desired height is formed, then applying a separating member to the heel-blank, then forming in like manner a second heel-blank upon said separating member, and continuing the above operations while confining a plurality of separated heel-blanks thus formed in column formation and under pressure.

11. The method of building heel-blanks which consists in continuously cutting lifts and superimposing each lift in the order of its cutting upon, and attaching it to, a preceding lift with accompaniment of pressure, until a heel-blank of the desired height is formed, then applying a separating member to the heel-blank, then forming in like manner a second heel-blank upon said separating member, and continuing the above operations while confining a plurality of the separated heel-blanks thus formed in column formation and under pressure.

12. The method of building heel-blanks which consists in continuously cutting lifts and superimposing each lift as cut upon, and attaching it to, a preceding lift with accompaniment of pressure, until a heel-blank of the desired height is formed, then applying a plate to the heel-blank, then forming in like manner a second heel-blank upon said plate, and continuing the above operations while confining a plurality of the separated heel-blanks thus formed in column formation and under pressure.

13. The method of building heel-blanks which consists in continuously cutting lifts and (simultaneously with its cutting) superimposing each lift upon, and attaching it to, a preceding lift with accompaniment of pressure, until a heel-blank of the desired height is formed, then applying a rand to the heel-blank, then forming in like manner a second heel-blank upon, but in separated relation to, the first heel-blank, and continuing the above operations while confining a plurality of the separated heel-blanks thus formed in column formation and under pressure.

14. The method of building heel-blanks which consists in continuously cutting and pasting lifts and superimposing each lift as cut upon a preceding pasted lift with accompaniment of pressure, until a heel-blank of the desired height is formed, then cutting and simultaneously placing upon the pasted surface of the heel-blank a rand, then placing a separator upon the randed heel-blank, then forming in like manner a second randed heel-blank upon said separator, and continuing the above operations while confining a plurality of the separated randed heel-blanks thus formed in column formation and under pressure.

15. The method of building heel-blanks which consists in continuously cutting and pasting lifts and superimposing each lift as cut upon a preceding pasted lift with accompaniment of pressure until a heel-blank of the desired height is formed, then applying a rand to the heel-blank, then applying a plate to the heel-blank having its under surface shaped to conform to the upper surface of the heel-blank with the rand applied, then forming a second heel-blank upon said plate, and continuing the above operations while confining a plurality of the separated heel-blanks thus formed in column formation and under pressure.

In testimony whereof, we have hereunto set our hands.

WILLIAM WOLFE.
DENNIS PARKS.

Copies of this patent may be obtained for five cents each, by addressing the "Commissioner of Patents, Washington, D. C."